United States Patent [19]

Hegar et al.

[11] Patent Number: 4,556,706
[45] Date of Patent: Dec. 3, 1985

[54] HEAVY METAL-CONTAINING FORMAZANE DYES CONTAINING A FIBER-REACTIVE FLUOROTRIAZINE GROUP

[75] Inventors: Gert Hegar, Schünenbuch; Herbert Seiler, Riehen, both of Switzerland

[73] Assignee: Ciba Geigy Corporation, Ardsley, N.Y.

[21] Appl. No.: 144,140

[22] Filed: Apr. 28, 1980

Related U.S. Application Data

[63] Continuation of Ser. No. 944,054, Sep. 19, 1978, abandoned, which is a continuation of Ser. No. 840,428, Oct. 7, 1977, abandoned, which is a continuation of Ser. No. 639,321, Dec. 10, 1975, abandoned.

[30] Foreign Application Priority Data

Dec. 20, 1974 [CH] Switzerland ............... 17039/74

[51] Int. Cl.$^4$ ............... C09B 62/018; C09B 62/038; C09B 62/095; D06P 1/382
[52] U.S. Cl. ............... 534/618; 534/652; 534/887
[58] Field of Search ........... 260/146 R, 146 D, 146 T, 260/147, 149, 150, 151; 534/618

[56] References Cited

U.S. PATENT DOCUMENTS 3,068,219 12/1962 Beffa et al. ............... 260/146 T
3,926,942 12/1975 Yelland ............... 260/146 T
4,024,123 12/1977 Dussy et al. ............... 260/146 D

FOREIGN PATENT DOCUMENTS 950861 2/1964 United Kingdom ............ 260/146 T
963426 7/1964 United Kingdom ............ 260/146 T
1161006 8/1969 United Kingdom ............ 260/146 T
1389053 4/1975 United Kingdom ............ 260/146 T Primary Examiner—Floyd D. Higel
Attorney, Agent, or Firm—Joseph G. Kolodny

[57] ABSTRACT

Dyes of formula

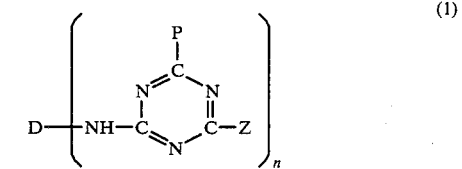

wherein D is the radical of a formazane dye of formula

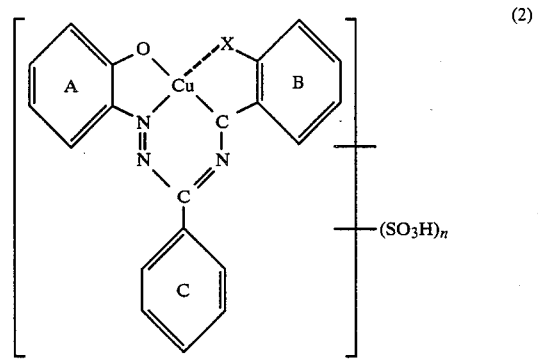

X is a group which is capable of complex formation, Z is a —NH$_2$ group, a substituted or unsubstituted aliphatic or aromatic amino group, n is 1 or 2 and m is an integer from 2 to 5, and the benzene rings A, B and C can contain further substituents in addition to the —SO$_3$H groups and the radicals of formula

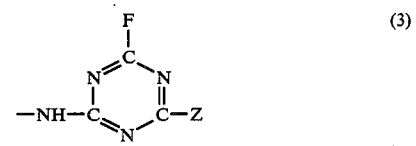

7 Claims, No Drawings

HEAVY METAL-CONTAINING FORMAZANE DYES CONTAINING A FIBER-REACTIVE FLUOROTRIAZINE GROUP

This is a continuation of application Ser. No. 944,054 filed Sept. 19, 1978 (now abandoned) which is in turn, a continuation of application Ser. No. 840,428 filed Oct. 7, 1977 (now abandoned) which is in turn a continuation of application Ser. No. 639,321 filed Dec. 10, 1975 (now abandoned).

The present invention provides water-soluble dyes which contain sulpho groups of the general formula

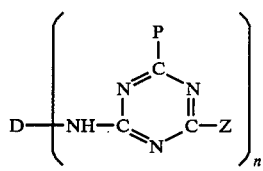

(1)

wherein D is the radical of a formazane dye of formula

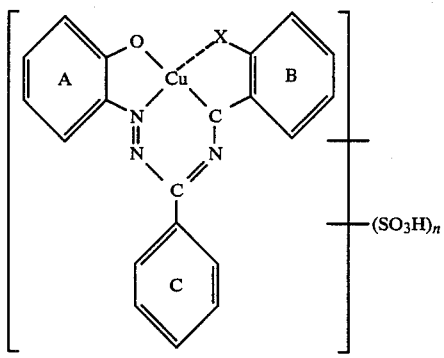

(2)

wherein X is a group which is capable of complex formation, in particular a hydroxy, carboxylic acid or sulphonic acid group, Z is a —NH$_3$ group, a substituted or unsubstituted aliphatic or aromatic amino group, n is 1 or 2 and n is an integer from 2 to 5. In addition to being substituted by sulphonic acid radicals and the radicals

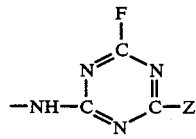

(3)

the benzene rings A, B and C can be substituted by further atoms and groups of atoms, for example by low molecular alkoxy or alkyl groups, halogen atoms, especially chlorine or bromine, alkylsulphonyl groups, aminosulphonyl groups, phenyl radicals or fused phenyl radicals.

The dyes of formula (I) are fibre-reactive, since they contain at least one fluoro-1,3,5-triazine radical.

By fibre-reactive dyes are meant those dyes that are able to react with the hydroxy groups of cellulose or with the amino groups of natural or synthetic polyamides to form covalent chemical bonds.

Substituents Z at the triazine ring are in particular radicals of primary, secondary and tertiary amines, for example —NH$_2$, —NHCH$_3$, —NHC$_2$H$_3$, —N(CH$_3$)$_2$, —N(a$_2$H$_5$)$_2$, —NHC$_2$H$_4$OH, —N(C$_2$H$_4$ON)$_2$, morydolino, piperidino, N-phenylamine, N-(2-, 3- or 4-sulphonxphenyl)-amino, N-toluidino, N-(2,4- or 2,5-disulphonphenyl)-amino, and also amines of dyestuff character, for example dyes which contain amino groups of the monoazo or polyazo, phthalocyanine, formazane, anthraquinone, stilbene, oxazime, dioxazine, triphenylmethne, nitro or azomethine series.

The radical Z cam contain further reactive groups. In particular, Z can also be a radical of formula

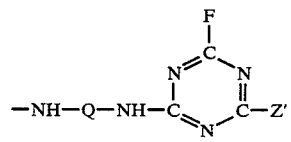

(4)

wherein Q is an aliphatic or aromatic bridge member and Z' has the same meaning as Z.

The radicals of formula

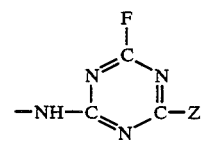

(3)

can be attached to the benzene rings A, B or C. Preferred dyes are those that contain one fluorotriazine radical to each formazane molecule.

As radicals of formula D-NH$_2$ there may be mentioned, for example, the copper complexes of:

N-(2-carboxy-4-sulphophenyl)-N'-(2'-hydroxy-2'-amino-b 5'-sulphophenyl)-ms-phenylferrazane.

N-(4-amino-2-carboxyphenyl)N'-(2'-hydroxy-3',5'-disulphophenyl)-ms-(2''-sulphophenyl)-formazane, N-(4-amino-2-carboxyphenyl)-N'-(2'-hydroxy-3',5'-disulphophenyl)-ms-(4''-amino-2''-sulphophenyl)-formazane, N-(2-sulphophenyl)-N'-(2'-hydroxy-3'-amino-5'-sulphophenyl)-ms-(3''-sulphophenyl)-formazane, N-(2-hydroxy-5-sulpho-3-aminophenyl)-N'-(2'-hydroxy-5'-sulphophenyl)-ms-phenylformazane, N-(2-hydroxy-5-sulpho-3-aminophenyl)-N'-(2'-carboxy-4'-sulphophenyl)-ms-(4''-sulphophenyl)-formazane, N-(2-hydroxy-5-sulphophenyl)-N'-(2'-carboxy-4'-aminophenyl)-ms-(2''-sulphophenyl)-formazane, N-(2-hydroxy-5-sulphophenyl)-N'-(2'-carboxy-4'-aminophenyl)-ms-(2''-chlor-5''-sulphophenyl)-formazane, N-(2-hydroxy-5-sulphophenyl)-N'-(2'-carboxy-4'-sulphophenyl)-ms-(4''-aminophenyl)-formazane, E-(2-hydroxy-5-sulphophenyl)-N'-(2'-carboxy-4'-sulphophenyl)-N-(2-carboxy-4-aminophenyl)-N'-(2'-hydroxy-4'-sulphonaphth-1'-yl)-ms-(2''-sulphophenyl)-formazane.

The dyes of the present invention can be obtained by various process modifications:

I. A forrazane dye of formula D—(NH$_2$)$_n$ is reacted first with n moles of 2,4,6-trifluoro-1,3,5-triazine and the resultant condensation product of formula

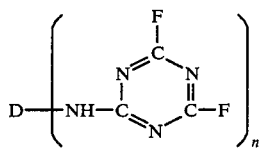

(5)

is condensed with n moles of an amine of formula Z—H.

II. A formazane dye of formula D—(NH$_2$)$_n$ is condensed with n moles of an intermediate of formula

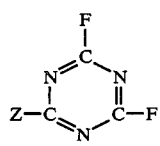

(6)

III. A formazane dye of formula D—NH$_2$ is condensed with 2,4,6-trifluoro-1,3,5-triazine and subsequently reacted with 1 mole of a diamine of formula H$_2$N—Q—NH$_2$. The intermediate of formula

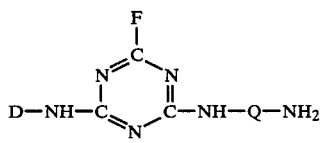

(7)

which is obtained is reacted either with (a) one equivalent of a compound of formula

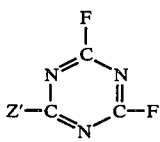

(8)

wherein has the same meaning as Z, to give the dye of formula (1), or with (b) one mole of 2,4,6-trifluoro-1,3,5-triazine to give a dye of formula

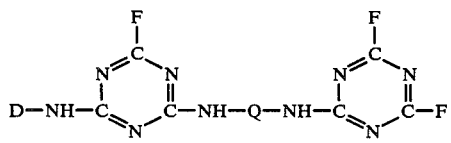

(9)

which is then reacted with 1 mole of the amine Z'-H.

Suitable amines of formula Z—H and Z'—H are, for example: ammonia, methylamine, ethylamine, dimethylamine, diethylamine, ethanolamine, dithanolamine, morpholine, piperidine, 2,3- or 4-aminotoluene, metanilic acid, sulphanilic acid, aniline, N-methylaniline, 4-aminobenzylsulphonic acid, 2,3- or 4-aminobenzoic acid, naphthylaminomonosulphonic acid, naphthylaminedisulphonic acid and naphthylaminetrisulphonic acid, and also dyes containing amino groups of the monoazo or polyazo, phthalocyanine, formazane, anthraquinone, stilbene, oxazine, dioxazine, triphenylmethane, nitro or azomethine series.

As intermediates of formulae

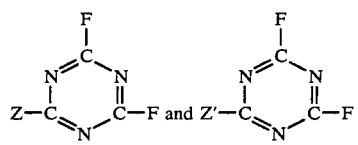

(6)        (8)

there may be mentioned: 2-amino-4,6-difluoro-1,3,5-triazine, 2-methylamino-4,6-difluoro-1,3,5-triazine, 2-anilino-4,6-difluoro-1,3,5-triazine, 2-(2'-sulphophenylamino)-4,6-difluoro-1,3,5-triazine, 2-(2',5'-disulphophenylamino)-4,6-difluoro-1,3,5-triazine, as well as the intermediates of dyestuff character, for example reaction products of dyes of the monoazo or polyazo, phthalocyanine, formazane, anthraquinone, stilbene, oxazine, dioxazine, triphenylmethane, nitro or azomethine series with 2,4,6-trifluoro-1,3,5-triazine.

Examples of suitable diamines of formula H$_2$N—Q—NH$_2$ are: ethylenediamine, 1,3-diaminopropane, 1 6-diaminohexane, 1,3- and 1,4-phenylenediamine, 1,3-phenylenediamine-4-sulphonic acid, 1,4-phenylenediamine-2-sulphonic acid, 2,4-diaminotoluene, 4,4'-diaminodiphenyl-2,2'-disulphonic acid, 4,4'-diaminodiphenyl urea-2,2'-disulphonic acid, 2,6-diaminonaphthalene-4,8-disulphonic acid, 4,4'-diaminodiphenyl ether-2,5-diaminobenzoic acid.

The reaction of the dyes or dyestuff intermediates with 2,4,6-trifluoro-1,3,5-triazine or its monocondensation products of formulae

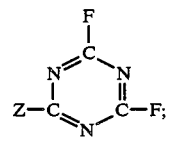

(6)

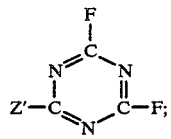

(8)

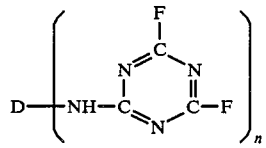

(5)

is carried out in aqueous solution or suspension at weakly acid, neutral or weakly alkaline pH values. Hydrogen fluoride liberated during the reaction is advantageously continuously neutralised by adding aqueous alkali lyes, carbonates or bicarbonates.

The dyes of the present invention are characterised by their pronounced reactivity.

The dyes of this invention can be isolated and processed to give useful, dry dyeing preparations. They are isolated preferably at as low temperature as possible by salting out and filtration. The filtered dyes can be dried, if appropriate, after addition of extenders and/or buffers, for example after addition of a mixture of equal parts of monosodium and disodium phosphate. Preferably the drying is effected at not too high temperatures and under reduced pressure. In certain cases the dry preparations of the present invention can be obtained direct by spray drying t entirebatch, i.e. without first isolating the dyes.

The dyes of the present invention are suitable for dyeing, and printing the most diverse kinds of material, for example silk, leather, wool, polyamide fibres and polyurethanes, and especially cellulosic materials of fibrous structure, for instance linen, cellulose, regenerated cellulose, and, above all, cotton. They are particularly suitable for dyeing by the pad dyeing process, in which the goods are impregnated with aqueous and optionally also with salt-containing dye solutions and the dyes are fixed after a treatment with alkali, or in the presence of alkali, optionally under the action of heat.

The dyes are also suitable for printing, especially on cotton as well as for printing nitrogenous fibres, for example wool, silk or blended fabrics that contain wool.

It is advisable to subject the dyeings and prints to a thorough rinsing with cold and hotwater, if appropriate with the addition of a dispersant that promotes the diffusion of non-fixed dye.

The following Examples illustrate the invention, the parts being by weight unless otherwise indicated.

EXAMPLE 1

64 parts of the copper complex of the disodium salt of N-(1-carboxy-4-sulphophenyl)-N-(2'-hydroxy-3'-amino-5'-sulphophenyl)-ms-phenylformazane are dissolved in 600 parts by volume of water. The solution is cooled to 0° C. and 13.5 parts of 2,4,6-trifluoro-1,3,5-triazine are added dropwise, the pH being kept at 6 by the simultaneous addition of aqueous sodium hydroxide solution. After termination of the condensation, 25 parts by volume of 24% aqueous ammonia solution are added dropwise at a pH of 9.5 to 10. The dye of formula

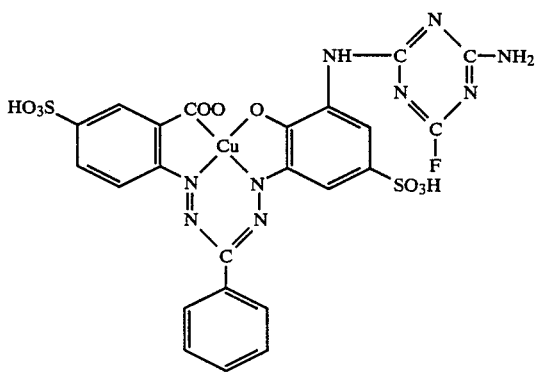

is precipitated by adding common salt. It dyes cellulose fibres in fast, blue shades.

EXAMPLE 2

The procedure of Example 1 is repeated, except that after completion of the condensation 100 parts by volume of a normal sodium sulphanilate solution are added instead of ammonia and condensation is effected at room temperature and pH 6.5 A blue dye with similar properties is obtained.

Further blue dyes are obtained by using equivalent amounts of the following amines instead of sulphanilic acid:

3. aniline-3-sulphonic acid
4. 2-amino-5-sulphobenzoic acid
5. anilino-N-methanesulphonic acid
6. 2-aminotoluene
7. 2-aminotoluene-5-sulphonic acid
8. N-methylaniline
9. morpholine
10. 2-aminoethanol
11. N,N-bis-2-hydroxyethylamine
12. 4-aminophenylmethanesulphonic acid .
13. 1-naphthylamine-5-sulphonic acid
14. 4-aminobenzoic acid
15. aniline
16. N-methylamine.

EXAMPLE 17

7.2 parts of the trisodium salt of the aminoformazane of formula

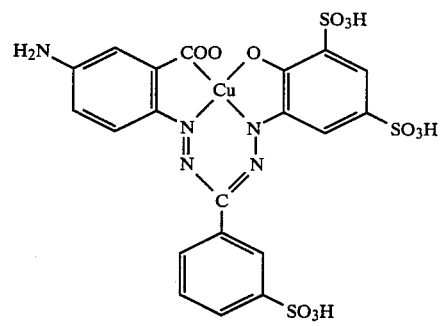

are dissolved neutral in 60 parts of water at 0° C. Then 1.4 parts of 2,4,6-trifluoro-1,3,5-triazine are added dropwise in the course of 10 minutes and the batch is stirred at pH 6.5 to 7 until completion of the condensation. Then 2.5 parts of a mixture of monosodium and disodium phosphate are added to the blue dyestuff solution in the molar ratio 1:1.2 and the dye is subsequently precipitated by adding common salt. The precipitate is filtered off and dried to yield a dark dyestuff powder which dissolves in water to give a greenish blue solution and dyes cotton fabric in fast, greenish blue shades.

EXAMPLE 18

The procedure of Example 17 is repeated except that 1.8 parts of 1-aminobenzene-3-sulphonic acid are also added after termination of the first condensation and condensation is effected at pH 6.5 and a temperature of 30° C. The dyestuff solution is evaporated to dryness in vacuo at 70° C.

EXAMPLE 19

1.73 parts of aniline-2-sulphonic acid are dissolved in 30 parts by volume of water with the addition of sodium hydroxide solution as neutral sodium salt. Then 0.9 part by volume of 2,4,6-trifluoro-1,3,5-triazine is added dropwise at 0° C. and the pH is kept at 6.5 by simultaneously dropping in dilute sodium hydroxide solution. To the colourless suspension of the monocondensation product is then added a solution of 7.2 parts of the trisodium salt of the copper complex of N-(4-amino-2-carboxyphenyl)-N'-(2'-hydroxy-3'-5'-disulphophenyl)-ms-(2''-sulphophenyl)-formazane in 40 parts of water and condensation is carried out at 15° to 20° C. and a constant pH of 6.5. After the condensation is terminated, the resultant formazane dye, which contains a further reactive fluorine atom, is precipitated by sprinkling in potassium chloride, filtered off and dried. It is then ground to yield a bluish black dyestuff powder which dyes cotton in neutral blue shades from an aqueous liquor.

A dye with a similar shade is obtained by using 2.53 parts of aniline-2,5-disulphonic acid instead of aniline-2-suphonic acid.

The procedure of Example 1 is repeated, except that the 64 parts of the copper complex of N-(2'-carboxy-4'-sulphophenyl)-N'-(2'-hydroxy-3'-amino-5'-sulphophenyl)-ms-phenylformazane are replaced by the indicated amount of the formazanes listed in the following Table which are reacted by condensation with 2,4,6-trifluorotriazine, wherein the second fluorine atom is further reacted with the amine

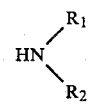

| | aminoformazane | $R_1$ | $R_2$ | Shade on CO |
|---|---|---|---|---|
| 20 | copper complex of N—(2-hydroxy-3-amino-5-sulphephenyl)-N'—(2'-carboxy-4'-sulphophenyl)-ms-(2''-chloro-5''-sulphophenyl)-formazane, 67.6 parts | —H | phenyl-SO$_3$H | blue |
| 21 | copper complex of N—(2-hydroxy-5-amino-3-sulphophenyl)-N'—(2',5'-disulphephenyl)-ms-phenylformazane, 63.3 parts | —H | phenyl-CH$_3$ | blue |
| 22 | copper complex of N—(2-carboxy-4-aminophenyl)-N'—(2'-hydroxy-5'-methylsulphenyl-3'-sulpho phenyl)-ms-(2''-sulphophenyl)-formazane, 63 parts | —H | phenyl-SO$_3$H | blue |
| 23 | copper complex of N—(2-carboxy-5-sulphophenyl)-N'—(2'-hydroxy-3',5'-disulphophenyl)-ms-(3''-aminophenyl)-formazane, 68 parts | —H | CH$_3$-phenyl-SO$_3$H | greenish blue |
| 24 | copper complex of N—(4-amino-2-sulphophenyl)-N'—(2'-hydroxy-4'-sulphophenyl)-ms-(4''-chloro-3''-sulphophenyl)-formazane, 66.6 parts | —CH$_3$ | phenyl | blue |
| 25 | copper complex of N—(2-hydroxy-3-amino-5-sulphophenyl)N'—(2'-hydroxy-4'-sulphophenyl)-ms-(2''-sulphophenyl), 64.8 parts | —H | | mary blue |
| 26 | copper complex of N—(2-carboxy-5-sulphophenyl)-N'—(2'-hydroxy-5'-amino-3'-sulphophenyl)-ms-(4''-sulphenyl)-formazane, 68 parts | —H | phenyl-Cl | blue |
| 27 | copper complex of N—(2-carboxy-5-sulphophenyl)-N'—(2'-hydroxy-3'-amino-5'-sulphophenyl)-ms-phenylformazane, 64 parts | —H | —H | blue |
| 28 | copper complex of N—(2-carboxy-4-sulphophenyl)-N'—(2'-hydroxy-3'-amino-5'-sulphophenyl)-ms-phenylformazane, 64 parts | —H | —H | blue |
| 29 | copper complex of N—(2-carboxy-4-sulphophenyl)-N'—(2'-hydroxy-3'-amino-5'-sulphophenyl)-ms-phenylformazane, 64 parts | —H | Cl-phenyl | blue |

-continued

| | aminoformazane | $R_1$ | $R_2$ | Shade on CO |
|---|---|---|---|---|
| 30 | copper complex of N—(2-carboxy-4-sulphophenyl)-N'—(2'-hydroxy-3'-amino-5'-sulphophenyl)-ms-phenylformazane, 64 parts | —CH$_3$ | 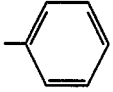 | blue |
| 31 | N—(2,4-disulphephenyl)-N'—(2'-hydroxy-4,6-disulphephenyl)-ms-(3''-aminophenyl)-formazane, 60 parts | —CH$_3$ | —CH$_2$CH$_2$SO$_3^-$ Na$^+$ | blue |
| 32 | copper complex of N—(2-carboxy-5-sulphophenyl)-N'—(2'-hydroxy-3'-amino-5'-sulphophenyl)-ms-(4''-methoxyphenyl)-formazane, 67 parts | —H |  and 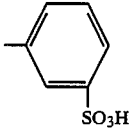 | blue 1:1-mixture |
| 33 | copper complex of N—(2-carboxy-5-sulphophenyl) N'—(2'-hydroxy-4'-methylsulphenyl-6'-sulphophenyl)-ms-(3''-aminophenyl)-formazane, 68.5 parts | —H | —C$_2$H$_4$OH | blue |
| 34 | copper complex of N—(2-hydroxy-5-sulphophenyl)-N'—(2'-hydroxy-3',5'-disulphophenyl-ms-(4''-aminophenyl)-formazane, 62 parts | —CH$_3$ | —CH$_3$ | blue |
| 35 | copper complex of N—(2-carboxy-5-sulphophenyl)-N'—(2'-hydroxy-3'-amino-5'-sulphophenyl)-ms-(4''-methyl-3''-bromophenyl)-formazane, 73 parts | —H | —C$_4$H$_9$—n | blue |
| 36 | copper complex of N—(2-carboxy-4-aminophenyl)-n'-(2'-hydroxy-4'-sulphonaphth-1'-yl)-ms-(2''-sulphophenyl)-formazane, 69 parts | —H | 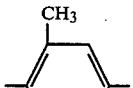 | blue |

EXAMPLE 37

64 parts of the diaminoformazane compound of formula

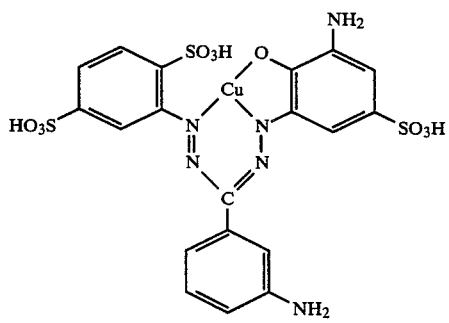

obtained by coupling diazotised 2-amino-6-acetylaminophenol-4-sulphonic acid to the hydrazone obtained from 2,5-disulphophenylhydrazine and 3-aminobenzaldehyde and subsequently saponifying the acetylamino group, are dissolved in 600 parts by volume of water at pH 7. Then 27 parts of 2,4,6-trifluoro-1,3,5-triazine are added dropwise at 0° C. in the course of 30 minutes and the mixture is stirred at pH 6.5 until the condensation is terminated. A concentrated aqueous ammonia solution is then added dropwise to the reaction mixture in such a manner that the pH is kept between 9.5 and 10. The condensation is terminated when the pH of the reaction mixture remains constant without further addition of ammonia and a chromatogram reveals no more starting dye. The dye containing two reactive fluorine atoms is isolated from the blue dyestuff solution by sprinkling in medium chloride. It dyes cotton in fast, greenish blue shades by the exhaustion process.

EXAMPLE 38

64 parts of the copper complex of the disodium salt of N-(2-carboxy-4-sulphophenyl)-N'-(2'-hydroxy-3'-amino-5'-sulphophenyl)-ms-phenykformazano are dissolved in 500 parts by volume of water. The solution is cooled to 0° C. and 13.5 parts of 2,4,6-trifluoro-1,3,5-triazine are added dropwise, the pH being kept at 6 by simultaneously adding 21 parts of aqueous sodium hydroxide solution, then the condensation is terminated, an aqueous solution of 21 parts of the sodium salt of 1,3-phenylenediamine-4-sulphonic acid is added. The reaction mixture is slowly warmed to room temperature and the hydrogen fluoride evolved during the condensation is neutralised by the continuous dropwise addition of sodium hydrozide solution to that the pH is kept at 6.5. The reaction mixture is cooled again to 0° C. and a further 13.5 parts of 2,4,6-trifluoro-1,3,5-triazine are added. When the condensation is terminated, an aqueous ammonia solution is added dropwise in such a manner that the pH of the reaction mixture remains between 0.5 and 10 and the temperature is simultaneously allowed to rise to 25° C. The dye is precipitated by sprinkling in common salt, then filtered off and dried. It then ground to yield a bluish black powder of the dye of the presumed formula

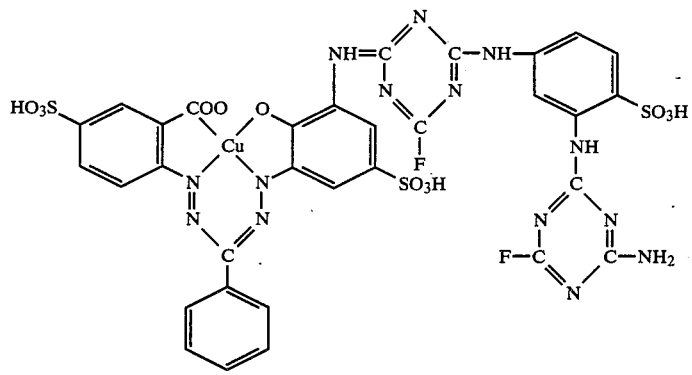

which dissolves in water to give a blue solution and dyes cellulose fibres in fast, neutral blue shades.

A blue dye in which, in accordance with the above formula, the amino group at the triazine radical is replaced by the radical of a formazane dye, is also obtained by substituting a solution of 64 parts of the copper complex of the disodium salt of N-(2-carboxy-4-sulphophenyl)-N'-(2'-hydroxy-3'-amino-5'-sulphobenyl)-ms-phenylformazane for the aqueous ammonia solution in the last reaction step.

EXAMPLE 39

37 parts of the aminofermazane of formula are reacted first with 6.75 parts of 2,4,6-trifluoro-1,3,5-triazine in accordance with the particulars of Example 1. To the solution of the resultant blue formazane dye, which contains two reactive fluorine atoms, is then added a solution of 24.5 parts of the disodium salt of the yellow pyridine dye of formula

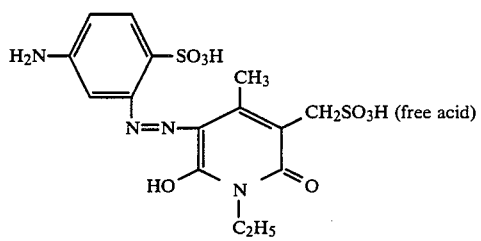

and the reaction mixture is stirred at 15°–20° C., the pH being kept at 6 to 7 by the continuous addition of 2 normal sodium carbonate solution. After termination of the condensation, the green reaction solution is evaporated to dryers under reduced pressure to yield a dry dyestuff powder that contains the dye of formula

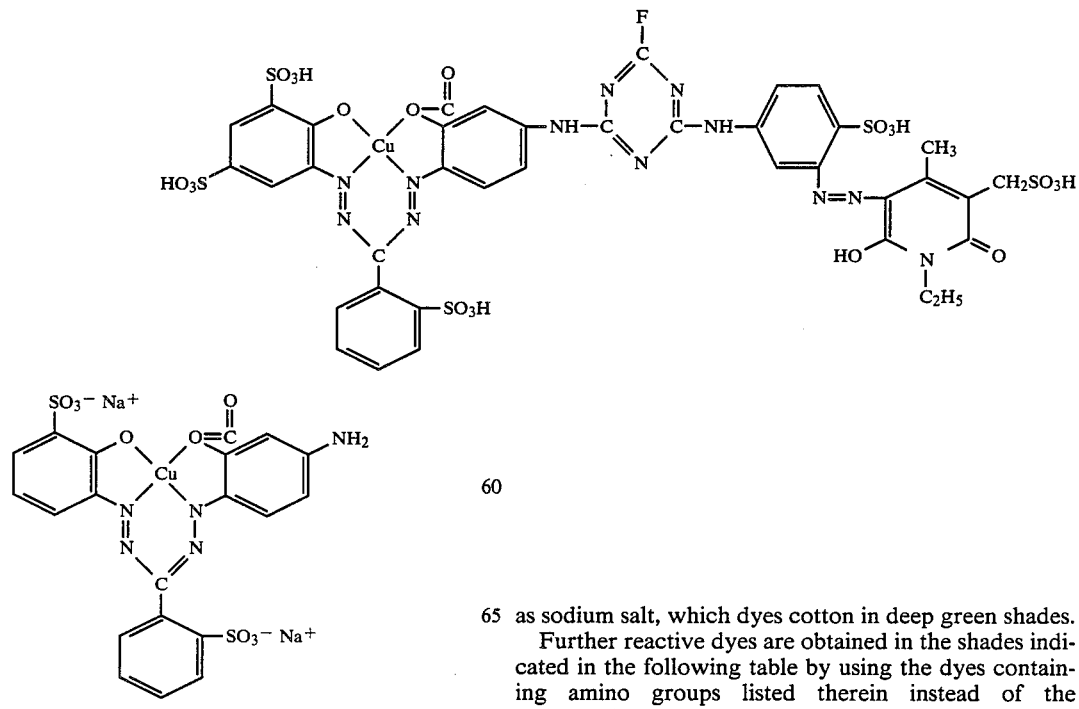

as sodium salt, which dyes cotton in deep green shades.

Further reactive dyes are obtained in the shades indicated in the following table by using the dyes containing amino groups listed therein instead of the aminopyridone dye.

| No. | dye containing amine groups | shade on cotton |
|---|---|---|
| 40 | [naphthalene with SO3H, HO3S, SO3H groups, azo-linked to phenyl with NH2 and NHCOCH3] | olive |
| 41 | H2N—[phenyl-SO3H]—N=N—C(=)—C—CH3 with HO—C, N, NH (pyrazolone) | green |
| 42 | H2N—[phenyl-SO3H]—CH=CH—[phenyl-SO3H]—NO2 | olive |

EXAMPLE 43

17.3 parts of 2-aminobenzene-1-sulphonic acid are dissolved at pH 3 in water. To the solution are added 11 parts of sodium hydrogen carbonate. After cooling to 0° C., 14 parts of 2,4,6-trifluoro-1,3,5-triazine are added in the course of 15 minutes. After the condensation is terminated. 21 parts of the sodium salt of 2,5-diamino-benzene-1-sulphonic acid are added and the reaction mixture is stirred until complete condensation has taken place at 20° C. and pH 6.5. The solution is again cooled to 0° C., treated with 11 parts of sodium hydrogen carbonate and condensed with 13.5 parts of 2,4,6-trifluoro-1,2,3-triazine. To this solution, which contains the intermediate of formula

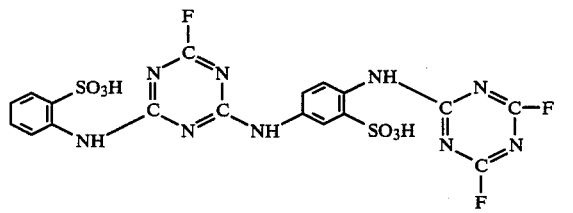

is then added a neutral aqueous solution of 64 parts of the copper complex of the disodium salt of N-(2-carboxy-5-sulphophenyl)-N'-(2'-hydroxy-3'-amino-5'-sulphonyl)-ms-phenylformazane and condensation is carried out at 20° C. to 25° C. and a pH of 6.5 to 7. The resultant blue dye, which contains two reactive fluorine atoms, is isolated by salting out, filtered off and dried. It dyes wovens of cellulosic material in fast, blue shades.

EXAMPLE 44

173 parts of 2-aminobenzeno-1-sulphonic acid are condensed first with 135 parts of 2,4,6-trifluoro-1,3,5-triazine. To the resulting suspension is added a solution of 640 parts of copper complex of the disodium salt of N-(2-carboxy-5-sulphophenyl)-N'-(2'-hydroxy-3'-amino-5'-sulphophenyl)-ms-phenylformazane in 4000 parts of water and condensation is carried out at room temperature. The pH is kept at 6.5 by addition of 5 normal sodium hydroxide solution. After termination of the condensation, the resultant dye solution is converted by spray drying into a bluish black dyestuff powder. The dye dyes cotton in fast, blue shades.

Further dyes which produce dyeings of the indicated shades on cotton are obtained by using the compounds listed in the following table instead of the condensation product of 2-aminobenzene-1-sulphonic acid for the condensation with the aminoformazane dye:

$$\begin{array}{c} R_1 \\ \diagdown \\ N-C \\ R_2 \end{array} \quad \text{triazine ring with F, F substituents}$$

| No. | R1 | R2 | Shade on cotton |
|---|---|---|---|
| 45 | —H | —H | blue |
| 46 | —H | —[phenyl] | blue |
| 47 | —CH3 | —[phenyl-CH3 (meta)] | blue |
| 48 | —H | —[phenyl]—CH3 | blue |
| 49 | —H | —[phenyl]—SO3H | green |
| 50 | —H | —[phenyl-SO3H]—N=N—[naphthalene with SO3H, SO3H, NH—CONH2, CH2SO3H, CONH2, HO, N, H, O substitution pattern] | olive |
| 50 | —H | —[phenyl-SO3H]—N=N—[naphthyl with SO3H, SO3H, NH—CONH2] | olive |
| 51 | —H | —[phenyl-SO3H]—C(HO)—N=N—C—C—CH3 with phenyl-SO3H substituent, pyrazolone-type | bluish green |

DYEING PROCEDURE 1

2 parts of the dye obtained according to Example 1 are dissolved in 100 parts of water while adding 0.5 part of sodium m-nitrobenzenesulphonate. A cotton fabric is impregnated with the resultant solution to a liquor pick-up of 75% and then dried.

The fabric is then impregnated with a 20° C. warm solution which contains per liter 5 g of sodium hydroxide and 300 g of sodium chloride and squeezed out to a pick-up of 75%. The dyeing is steamed for 1 minute at 100° to 101° C., soaped for a quarter of an hour in a 0.3% boiling solution of an ion-free detergent, rinsed and dried.

DYEING PROCEDURE II 2 parts of the dye obtained according to Example 1 are dissolved in 100 parts of water. The solution is added to 1900 parts of cold water, 60 parts of sodium chloride are added and 100 parts of a cotton fabric are put into this dye-bath.

The temperature is raised in 45 minutes to 75° C. in the course of which 40 parts of calcined sodium carbonate and another to parts of sodium chloride are added after 30 minutes. The temperature is kept for 30 minutes at 40° C. The dyeing is rinsed and then soaped for 15 minutes in a 0.3% boiling solution of an ion-free detergent, rinsed and dried.

PRINTING DIRECTION I 50 parts of the dye of Example 19 are stirred into a thickening consisting of 438 parts of 5% sodium alginate, 200 parts of urea, 300 parts of water and 12 parts of sodium bicarbonate. A cotton fabric is printed with this printing paste using a screen printing template, dried, and then steamed for 2 minutes at 100° C. The print is subsequently rinsed in water and soaped at the boil. A strong blue print pattern is obtained.

PRINTING DIRECTION II

A printing paste obtained according to the particulars of Direction I, but without the addition of sodium bicarbonate, is used. After it has been first dried, the print is fixed for 5 seconds at 100° C. by bing immersed in a solution that contains per liter 250 g of sodium chloride and 20 ml of 30% sodium hydroxide solution. The print is then rinsed and soaped.

We claim:

1. A dyestuff of the formula

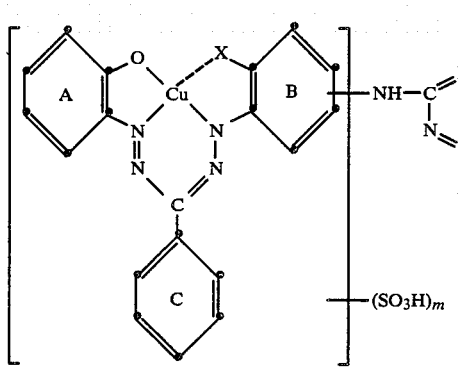

wherein the phenyl rings, A, B and C in addition to sulfo groups and the radical of the formula

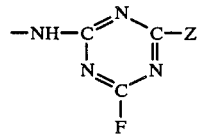

are unsubstituted or substituted by low-molecular alkyl, low-molecular alkoxy, halogen, low-molecular alkylsulfonyl and sulfamoyl and optionally contains a fused phenyl ring, X is hydroxy, carboxy or sulfo, Z is fluoro, $-NH_2$, a mono- or dialkylamino group with at most 6 carbon atoms, which is unsubstituted or substituted by hydroxy and sulfo, N-methyl-N-phenylamino, N-sulfomethyl-N-phenylamino, phenylamino which is unsubstituted or substituted by sulfo, carboxy, methyl, sulfomethyl and chloro or naphthylamine, which is substituted by sulfo, morpholino or piperidino and m is a positive integer from 2 to 5.

2. A dyestuff according to claim 1, wherein the phenyl rings A, B and C in addition to sulfo groups and the radical of the formula (3) are unsubstituted or substituted by methyl, methoxy, halogen or methylsulfonyl, X is carboxy and Z is $NH_2$, lower alkylamino or N,N-dilower alkylamino in which the alkyl group(s) are unsubstituted or substituted by hydroxy or sulfo, phenylamino which is unsubstituted or substituted by sulfo, carboxy, methyl, chloro or sulfomethyl, N-methyl-N-phenylamino, N-sulfomethyl-N-phenylamino or sulfonaphthylamino, and m is a positive integer from 2 to 5.

3. A dyestuff according to claim 2, wherein the radical of the formula (3) is bound to the phenyl ring A or B.

4. Dyes according to claim 1, wherein Z is $-NH_2$, phenylamino, toluylamino or 2-, 3- or 4-sulphophenylamino.

5. A dye according to claim 1, wherein 2' is $-NH_2$, phenylamino, toluylamino or 2-, 3- or 4-sulphophenylamino.

6. The dye of formula

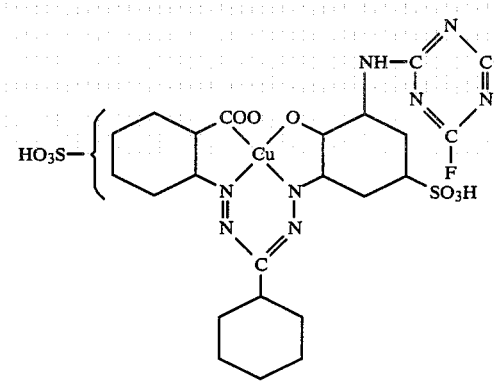

7. The dye of formula

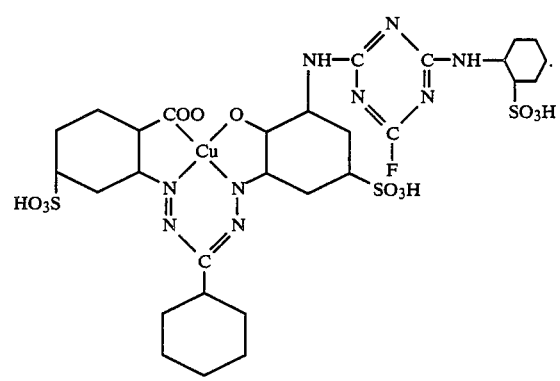

* * * * *